United States Patent
Shao et al.

(10) Patent No.: US 7,423,888 B2
(45) Date of Patent: Sep. 9, 2008

(54) VOLTAGE CONVERSION CIRCUIT AND SWITCHING POWER SUPPLY DEVICE

(75) Inventors: Geliang Shao, Saitama (JP); Hiroaki Takada, Saitama (JP)

(73) Assignee: Tamura Corporation, Tokyo (JP)

( * ) Notice: Subject to any disclaimer, the term of this patent is extended or adjusted under 35 U.S.C. 154(b) by 45 days.

(21) Appl. No.: 11/448,661

(22) Filed: Jun. 8, 2006

(65) Prior Publication Data

US 2006/0279967 A1      Dec. 14, 2006

(30) Foreign Application Priority Data

Jun. 8, 2005      (JP)      ............................... 2005-168109

(51) Int. Cl.
    *H02M 3/335*      (2006.01)
(52) U.S. Cl. .................... 363/21.04; 363/21.06; 363/49; 323/901
(58) Field of Classification Search .............. 363/21.04, 363/21.06, 21.08, 21.09, 21.1, 40, 49, 50, 363/56.01; 323/901
    See application file for complete search history.

(56) References Cited

U.S. PATENT DOCUMENTS

| | | | | |
|---|---|---|---|---|
| 6,295,213 B1* | 9/2001 | Smith | ....................... | 363/21.01 |
| 6,519,164 B1* | 2/2003 | Weng et al. | ............... | 363/21.04 |
| 6,650,560 B2* | 11/2003 | MacDonald et al. | ........ | 363/142 |
| 7,218,081 B2* | 5/2007 | Jang et al. | .................... | 323/266 |
| 7,251,146 B2* | 7/2007 | Aso | .......................... | 363/21.04 |
| 2005/0162140 A1* | 7/2005 | Hirst | ........................... | 323/273 |

* cited by examiner

*Primary Examiner*—Jessica Han
*Assistant Examiner*—Emily Pham
(74) *Attorney, Agent, or Firm*—Arent Fox LLP

(57) ABSTRACT

A voltage conversion circuit and a switching power supply device achieving both a good response and a low loss of a power supply voltage, wherein a main voltage conversion portion (circuit block) for conversion an AC voltage to a DC voltage, an auxiliary voltage conversion portion for the same conversion but in transit period up to shifting to a stationary state, a voltage limiting portion (Zener diode) for limiting the DC voltage output from the auxiliary voltage conversion portion to a constant limit-voltage, and an output control switch (transistor) connected in the output pass and for switching the pass to conductive or nonconductive possible to apply a higher voltage in between a voltage at the output node and the limit-voltage based on their magnitude relation.

4 Claims, 7 Drawing Sheets

VOLTAGE CONVERSION CIRCUIT AND SWITCHING POWER SUPPLY DEVICE

BACKGROUND OF THE INVENTION

1. Field of Invention

The present invention relates to technology for converting an AC voltage to a DC voltage, more particularly relates to technology built into a switching power supply device and generating a desired power supply voltage based on an electric signal excited in a secondary winding of a transformer.

2. Description of the Related Art

In a switching power supply device, sometimes a drive circuit for operating the switching element and an auxiliary power supply circuit for supplying electric power to the control circuit are provided. An example of this auxiliary power supply circuit will be described related to FIG. 1. FIG. 1 is a diagram showing a circuit configuration of a forward type switching power supply device in related art. In FIG. 1, in addition to a basic configuration of the forward type switching power supply device, an auxiliary power supply circuit generating a power supply voltage supplied to a control circuit node (not shown) for driving a rectification circuit on the secondary side of a transformer T1 is shown.

The auxiliary power supply circuit shown in FIG. 1 includes a diode D100, capacitors C200 and C300, a transistor Q100, and a resistor R100 and generates a targeted power supply voltage Vcc from an emitter of the transistor Q100. In the auxiliary power supply circuit of FIG. 1, a pulse width modulation signal using an input voltage V1 as a peak voltage is given to the transformer T1 under the control of a switch element M300. Usually, in order to reduce the stress of a load at the time of activation of the power source, the switching power supply device performs a soft start gradually raising an output voltage until a prescribed value is reached. In this soft start, the PWM signal given to the transformer T1 gradually prolongs a conductive time of the switch element M300, that is, gradually enlarges a duty ratio.

In the auxiliary power supply circuit of FIG. 1, when a voltage Vs of one end of the secondary winding of the transformer T1 is positive, a base current is supplied to the transistor Q100 through the diode D100, the transistor Q100 turns on, and the desired power supply voltage Vcc is generated on both ends of the capacitor C300.

In the auxiliary power supply circuit shown in FIG. 1, however, when the voltage Vs of one end of the secondary winding of the transformer T1 becomes positive, it quickly turns on the transistor Q100, therefore the response of the power supply voltage Vcc is fast, so overshoot of an output voltage VO due to a delay of the power supply voltage Vcc can be reduced. However, after the power supply voltage reaches the prescribed value, there is a disadvantage of a large loss of the electric power by the transistor Q100. Therefore, an auxiliary power supply circuit with a high efficiency cannot be configured in the switching power supply device.

SUMMARY OF THE INVENTION

It is therefore desirable in the present invention to provide a voltage conversion circuit and a switching power supply device achieving both a good response so as to achieve a DC output in the transit period up to be stable in input and low loss of the power supply voltage.

According to the present invention, there is provided a voltage conversion circuit comprising a main voltage conversion portion for conversion an input AC voltage to a DC voltage and outputting from an output terminal; an auxiliary voltage conversion portion for inputting the AC voltage, converting the AC voltage to a DC voltage in transit period of the AC voltage up to shifting to a stationary state and capable of outputting to the output terminal; a voltage limiting portion for limiting the DC voltage output from the auxiliary voltage conversion portion to a constant limit-voltage; and an output control switch connected in a pass between an output of the auxiliary voltage conversion portion and the output terminal and for switching the pass to conductive or nonconductive possible to apply a higher voltage in between a voltage at the output terminal and the limit-voltage based on their magnitude relation.

According to a second aspect of the present invention, there is provided a switching power supply device comprising: a switching circuit for switching an input voltage and generating a pulse width modulation signal; a transformer having a secondary winding and receiving the pulse width modulation signal; a rectification circuit including a plurality of switch elements for rectifying a voltage excited in the secondary winding of the transformer; a control circuit for switching conductive states of the plurality of rectifiers based on an output voltage of the rectification circuit; and a power supply voltage generation circuit for generation a power supply voltage to be supplied to the control circuit, wherein the power supply voltage generation circuit comprises a main voltage conversion portion for conversion an AC voltage exited on a secondary side of the transformer to a DC voltage and outputting the DC voltage to an output terminal connected with the control circuit, an auxiliary voltage conversion portion for inputting the AC voltage, converting the AC voltage to a DC voltage in transit period of the AC voltage up to shifting to a stationary state and capable of outputting the DC voltage to the output terminal, a voltage limiting portion for limiting the DC voltage output from the auxiliary voltage conversion portion to a constant limit-voltage, and an output control switch connected in a pass between an output of the auxiliary voltage conversion portion and the output terminal and for switching the pass to conductive or nonconductive possible to apply a higher voltage in between a voltage at the output terminal and the limit-voltage based on their magnitude relation.

In the above present invention, wherein the switching circuit executes a soft start control in which duty ratio of the pulse width modulation signal linearly increases up to a stable state having a constant duty ratio.

Note that, in the present invention, the "AC voltage excited on the secondary side of the transformer" is can be input via not only one terminal of the secondary winding, but also for example one end of a control winding, an auxiliary winding, or the like provided on the secondary side.

According to the present invention, it becomes possible to achieve both a good response and a low loss of the input AC voltage or the power supply voltage.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, a switching power supply device provided with a voltage conversion circuit according to an embodiment of the present invention is described with reference to the attached drawings.

First Embodiment

Figure 1:
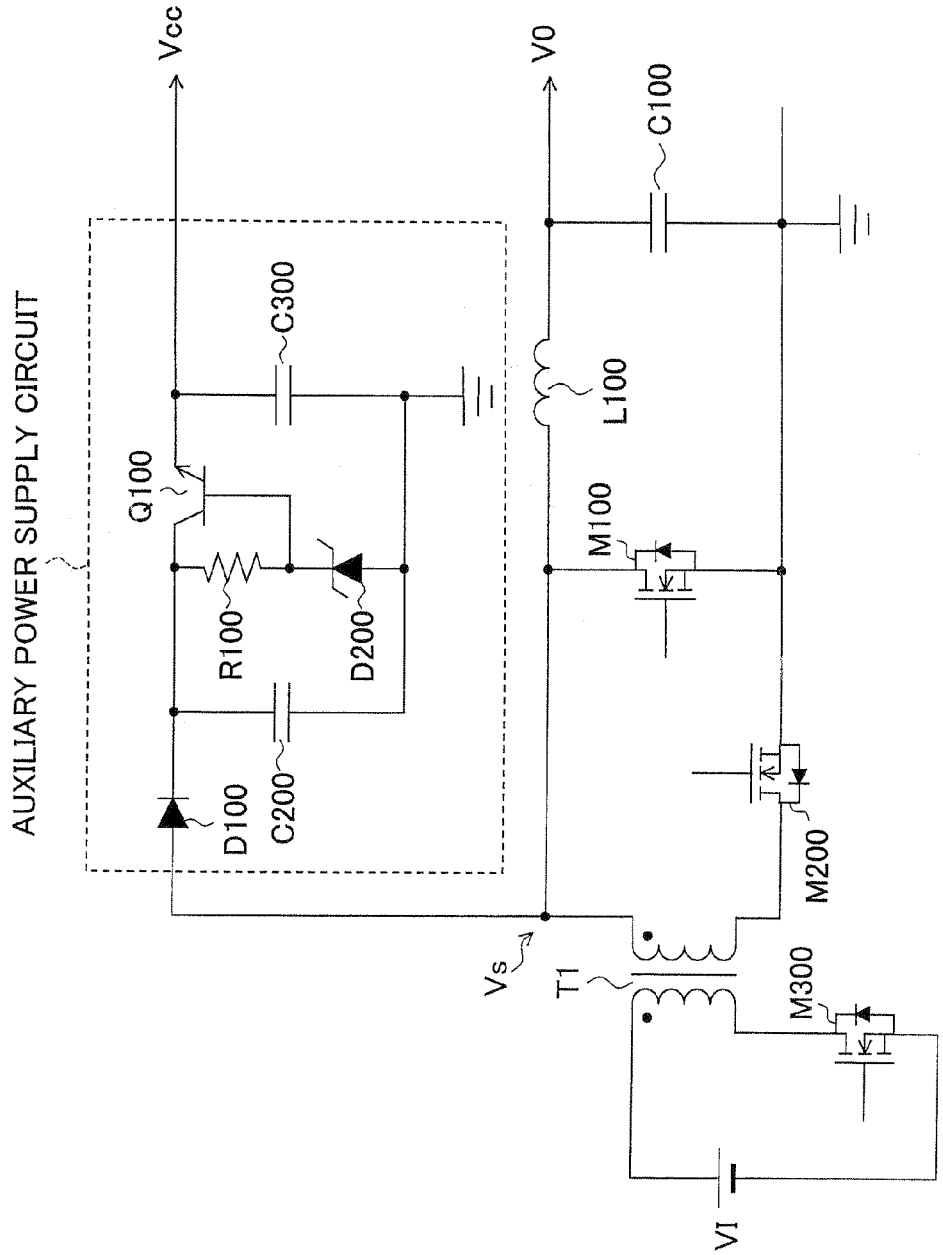
FIG. 1 is a diagram showing the circuit configuration of a forward type switching power supply device of the related art.
Figure 2:
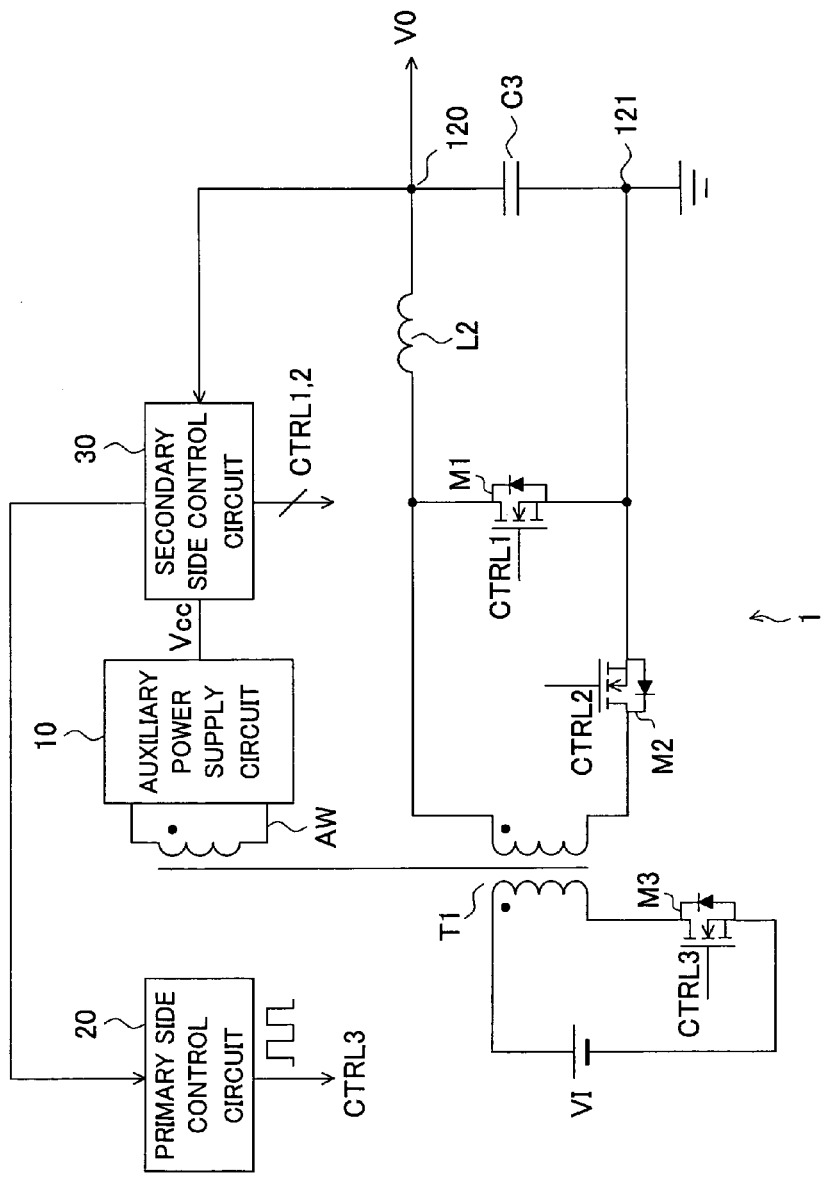
FIG. 2 is a diagram of the system configuration of a switching power supply device according to an embodiment of the present invention.

FIG. 2 is a diagram of the system configuration of a switching power supply device 1 according to an embodiment of the present invention. In the present embodiment, as an example, a forward type switching power supply device 1 is described below. In the forward type switching power supply device 1, an input voltage VI is given to a primary side of the transformer T1. The transformer T1 is given a pulse width modulation (PWM) signal using the input voltage VI as a peak voltage by the switch operation of an NMOS transistor M3. The PWM signal is transmitted to the secondary side with the same polarity by the transformer T1.

On the secondary side of the transformer T1, a coil L2 is connected between one end of the secondary winding and a node 120 (output terminal), and a capacitor C3 is connected between the node 120 (output terminal) and a node 121 (ground terminal) to thereby configure a smoothing circuit of choke input type. Further, the rectification circuit is configured by an NMOS transistor M2 rectifying the current when ON and an NMOS transistor M1 for carrying the energy released from the choke (coil L2) when the NMOS transistor M2 is OFF.

The secondary side control circuit 30 monitors the output voltage VO and controls the conductive states of the NMOS transistors M1 and M2 by control signals CTRL1 and CTRL2 so that the output voltage VO becomes a desired value. The output voltage VO is insulated by for example a photocoupler via the secondary side control circuit 30 and transmitted to the primary side control circuit 20. The primary side control circuit 20 controls the conductive state of the NMOS transistor M3 by a control signal CTRL3 so that the output voltage VO becomes the desired value. Namely, the duty ratio of the PWM signal given to the transformer T1 is controlled.

The transformer T1 is provided with an auxiliary winding AW. The power of the PWM signal generated on the primary side of the transformer T1 is transmitted via this auxiliary winding AW by the auxiliary power supply circuit 10. The auxiliary power supply circuit 10 generates the power supply voltage Vcc supplied to the secondary side control circuit 30 based on this power. This auxiliary power supply circuit 10 corresponds to the voltage conversion circuit of the power supply voltage generation circuit of the present invention.

Figure 3:
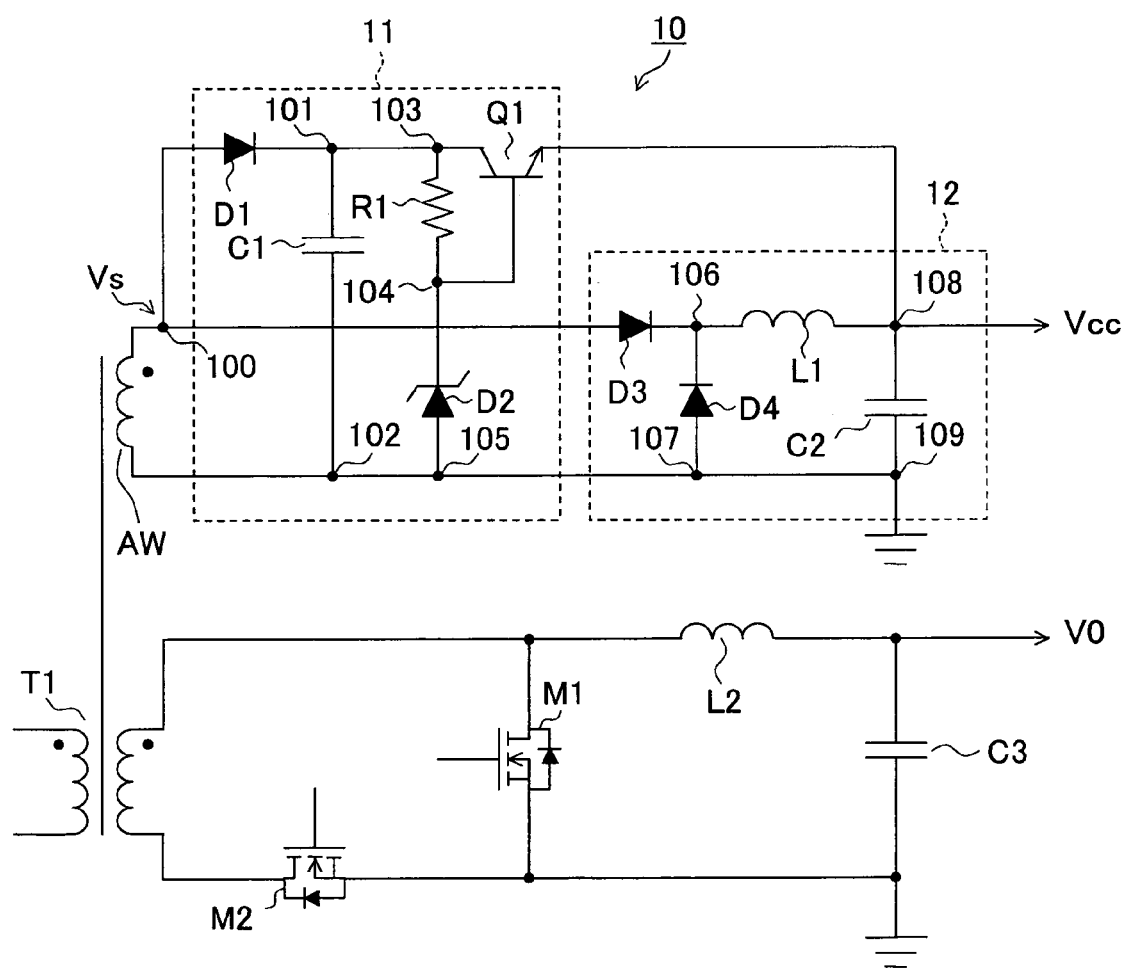
FIG. 3 is a diagram showing an example of the circuit configuration of an auxiliary power supply circuit.

Next, the specific configuration of the auxiliary power supply circuit 10 is described below with reference to FIG. 3. FIG. 3 is a diagram showing an example of the circuit configuration of the auxiliary power supply circuit 10.

Usually, the switching power supply device reduces the stress of the load at the time of activation of the power source by gradually raising the output voltage until the prescribed value is reached in a "soft start". In this soft start, the PWM signal given to the transformer T1 gradually increases the conductive time of the switch element M3, that is, gradually enlarges the duty ratio. In the present embodiment, in the auxiliary power supply circuit 10, as shown in FIG. 3, a circuit block 11 and a circuit block 12 are connected in parallel between a node 100 (one end of the auxiliary winding AW) and a node 108 (output terminal of the auxiliary power supply circuit 10). The circuit block 11 is a linear mode use circuit having a high response in a transit period until the power supply voltage reaches the prescribed value Vcc, while the circuit block 12 becomes a switching mode use circuit having a high efficiency in a period after the power supply voltage reaches the prescribed value Vcc.

Below, the circuit configurations of the circuit blocks 11 and 12 are described.

The circuit block 11 includes a transistor Q1, diodes D1 and D2, a resistor R1, and a capacitor C1. The diode D1 is connected at the anode to the node 100 and connected at the cathode to a node 101. The diode D1 turns on when a predetermined positive voltage is generated in the voltage Vs of the node 100 as one end of the auxiliary winding AW and transmits the voltage Vs to the capacitor C1 and the collector etc. of the transistor Q1. The capacitor C1 is connected between the node 101 and a node 102 (ground terminal). The capacitor C1 is charged when the voltage Vs is the positive voltage and holds its charged voltage when the voltage Vs is 0. The resistor R1 is connected between a node 103 and a node 104 and supplies the base current to the transistor Q1. The diode D2 is connected between the node 104 and a node 105 (ground terminal). The diode D2 is a Zener diode (constant voltage diode) provided for clamping the output voltage of the circuit block 11, that is, the emitter voltage of the transistor Q1, to a predetermined level. Note that a breakdown voltage of the diode D2 is set to a value a little smaller than (target power supply voltage $V_{TAR}$—forward direction voltage $V_{BE}$ of transistor Q1). Due to the above configuration, the circuit block 11 linearly generates the output voltage with respect to the input voltage Vs, therefore functions in a linear mode.

The circuit block 12 includes a coil L1, a capacitor C2, and diodes D3 and D4. The diode D3 is connected at the anode to the node 100 (one end of the auxiliary winding AW) and connected at the cathode to a node 106. The diode D3 turns on when the voltage Vs is a positive voltage and rectifies the voltage generated in the auxiliary winding AW. The coil L1 is connected between the node 106 and the node 108 (power supply voltage output terminal), and the capacitor C2 is connected between the node 108 and a node 109 (ground terminal). The coil L1 and the capacitor C2 configure a smoothing circuit. Due to this, the ripple of the voltage rectified by the diode D3 and the current is reduced, and the power supply voltage output is generated at the node 108. Note that the output response with respect to the voltage Vs is delayed when compared with the circuit block 11. The diode D4 is connected between the node 106 and a node 107 (ground terminal) and functions as a return diode. Namely, during the period when the voltage Vs is 0, it releases the energy stored in the coil L1. Due to the above configuration, the circuit block 12 operates in response to the switching on the primary side of the transformer T1, therefore functions as a switching mode.

In the auxiliary power supply circuit 10 shown in FIG. 3, the circuit block 11 and the circuit block 12 are connected in parallel between the node 100 (one end of the auxiliary winding AW) and the node 108 (power supply voltage output terminal), but at the time of the start of operation of the auxiliary power supply circuit 10, first, the voltage generated by the circuit block 11 is output, then, during the period until the output voltage Vcc reaches the target power supply voltage $V_{TAR}$, the conductive state of the output route of the circuit block 11 is switched so that the voltage generated by the circuit block 12 is output. Namely, at the time of the start of the operation, it operates in the linear mode first, then switches to the switching mode. This switching operation is described below.

In a soft start, the duty ratio immediately after the PWM signal generated on the primary side of the transformer T1 at the time of the activation of the power source is started is small. Due to the delay operation of the coil L1 and the capacitor C2, the rise of the output is delayed in the circuit block 12. On the other hand, in the circuit block 11, irrespective of the small duty ratio, due to the first rise of the voltage Vs generated in accordance with the peak voltage of the PWM signal, the diode D1 and the transistor Q1 quickly turn on, and the rise of the output is fast. Accordingly, immediately after activation by a soft start, the power supply voltage output Vcc observed at the node 108 is generated by the circuits block 11.

Thereafter, the duty ratio increases, so the output generated by the circuit block 12 (output of the coil L1) gradually rises. On the other hand, the output of the circuit block 11 (emitter voltage of the transistor Q1) cannot reach the target power supply voltage $V_{TAR}$ since the breakdown voltage of the Zener diode D2 is set at a value a little smaller than (target power supply voltage $V_{TAR}$—forward direction voltage $V_{VE}$ of transistor Q1). Then, the transistor Q1 turns off since $V_{BE}$ becomes smaller than 0.7V before the output generated by the circuit block 12 reaches the target power supply voltage $V_{TAR}$. Thereafter, the circuit block 11 cannot output. Accordingly, the conductive state of output route is switched before the target power supply voltage $V_{TAR}$ is observed in the node 108. Then, after the target power supply voltage $V_{TAR}$ is generated in the node 108, the power supply voltage will be generated mainly by the circuit block 12. In this way, the linear mode is switched to the switching mode.

Figure 4:
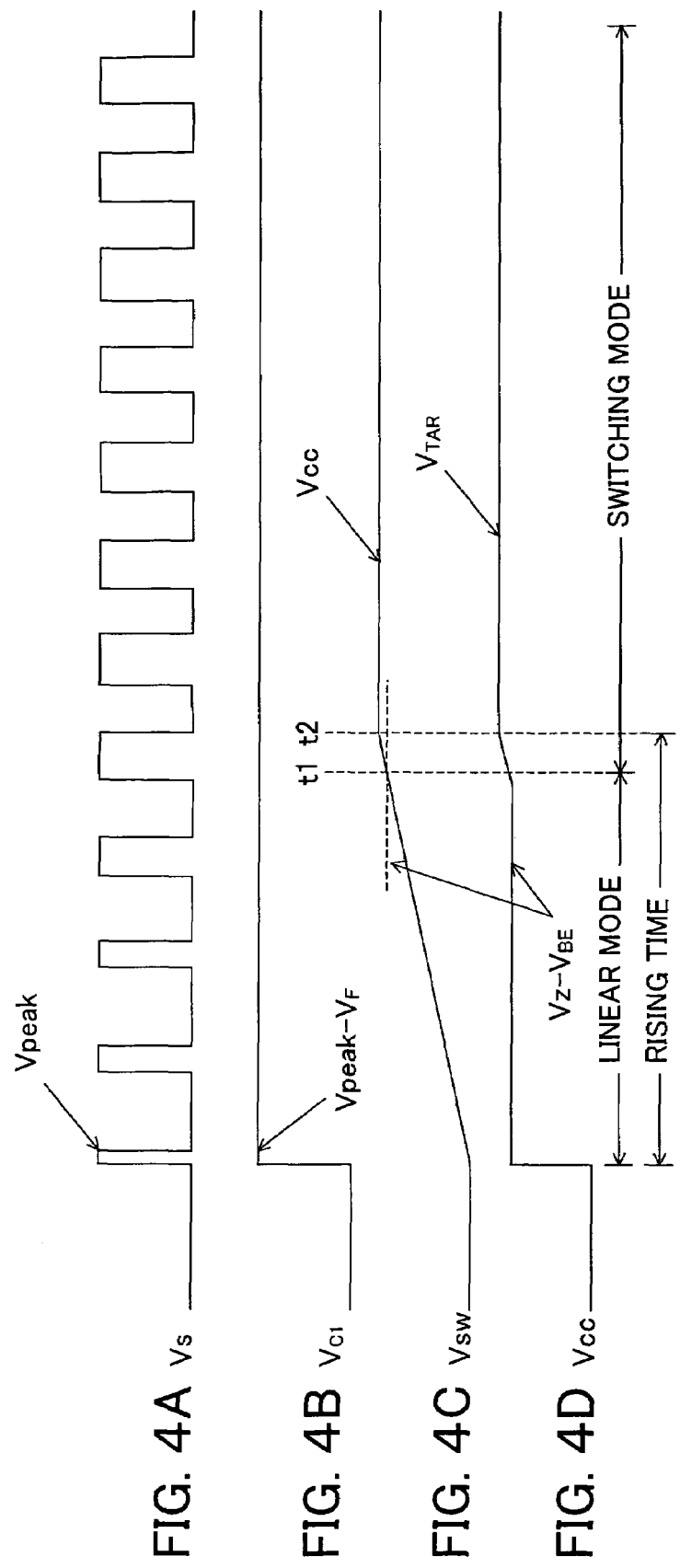
FIGS. 4A to 4D are timing charts showing an operation at the time of activation of the auxiliary power supply circuit.

Next, the operation at the time of activation of the auxiliary power supply circuit 10 is described below with reference to the timing charts of FIGS. 4A to 4D. FIG. 4A shows a waveform of the voltage Vs of the auxiliary winding AW, FIG. 4B shows a waveform of a charge voltage $V_{C1}$ of the capacitor C1 of the circuit block 11, FIG. 4C shows a waveform of an output voltage $V_{sw}$ of the circuit block 12 when assuming that the circuit block 11 does not exist, and FIG. 4D shows a waveform of the output voltage Vcc of the auxiliary power supply circuit 10.

As shown in FIG. 4A, at the soft start, the duty ratio immediately after the PWM signal generated on the primary side of the transformer T1 at the time of the activation of the power source is started is small. The period where the voltage Vs is a peak voltage $V_{peak}$ gradually increases. In the circuit block 11, the first pulse of the voltage Vs passes through the diode D1 and quickly charges the capacitor C1. As shown in FIG. 4B, the charge voltage $V_{C1}$ of the capacitor C1 becomes $(V_{peak}-V_F)$ ($V_F$: forward direction voltage of the diode D1) soon. Further, due to the first pulse of the voltage Vs, the base current is supplied via the resistor R1 to the transistor Q1 and the transistor Q1 quickly turns on. As shown in FIG. 4B, the output voltage Vcc in the node 108 becomes $(V_Z-V_{BE})$ ($V_Z$: breakdown voltage of the diode D2). In this way, immediately after the activation of the power source, the output becomes output in the linear mode.

Immediately after the commencement of the soft start, when assuming that the circuit block 11 does not exist, the rise of the output of the circuit block 12 becomes very slow as shown in FIG. 4C due to the delay operation of the coil L1 and the capacitor C2.

Next, as the duty ratio of the voltage Vs increases, the output generated by the circuit block 12 (output of the coil L1) gradually rises. On the other hand, the output of the circuit block 11 (emitter voltage of the transistor Q1) cannot reach the target power supply voltage $V_{TAR}$ since the breakdown voltage Vz of the Zener diode D2 is set at a value slightly smaller than the (target power supply voltage $V_{TAR}$—forward direction voltage $V_{BE}$ of the transistor Q1). Next, at a time t1 of FIGS. 4A to 4D, the output voltage generated by the circuit block 12 coincides with $(V_Z-V_{BE})$. The transistor Q1 turns off at the time t1 ($V_{BE}$=0.7V). After the time t1, the output becomes output in the switching mode of the circuit block 12. Namely, after the time t1, the waveforms shown in FIGS. 4C and 4D coincide. The time t1 which becomes the switching timing from the linear mode to the switching mode is set so as to become earlier than a rising time t2 of the auxiliary power supply circuit 10.

As described above, according to the auxiliary power supply circuit 10 according to the present embodiment, the circuit block 11 operating in the linear mode and the circuit block 12 operating in the switching mode are connected in parallel between the node 100 of one end of the auxiliary winding AW of the transformer T1 and the power supply output terminal (node 108). Immediately after the activation of the power source, the conductive state of output route is switched so that the power supply voltage Vcc is generated by the circuit block 11, and the power supply voltage Vcc is generated by the circuit block 12 before the target power supply voltage is reached. Accordingly, the following effects are obtained.

Namely, immediately after the activation of the power source, the circuit block 11 operates and the output voltage Vcc quickly rises up to $(V_Z-V_{BE})$ (value very near the target power supply voltage $V_{TAR}$), therefore the secondary side control circuit 30 can start normal operation soon. Accordingly, in the switching power supply device 1 according to the present embodiment, overshoot of the output voltage VO etc. which may occur since the rectifiers constituted by the NMOS transistors M1 and M2 are not correctly controlled immediately after activation do not occur.

Further, in the circuit block 11, the loss due to the transistor Q1 is large although the response speed of the output is fast, but after the output voltage Vcc of the auxiliary power supply circuit 10 reaches the target power supply voltage $V_{TAR}$ (more accurately, $(V_Z-V_{BE})$), the output voltage Vcc is generated mainly through the circuit block 11, therefore there is almost no power loss, and the efficiency is very high. In this way, in the auxiliary power supply circuit 10, by switching between the linear mode by the circuit block 11 and the switching mode by the circuit block 12 immediately after activation, a good response and a low loss (high efficiency) of the power supply voltage can be achieved.

Note that, in the explanation of the embodiment mentioned above, the case of the soft start was described, but even in a case where the soft start is not carried out, the response delay by the circuit block 12 occurs, therefore the same effects are obtained. Where the soft start is carried out, the duty ratio immediately after the activation is very small, and a quick output response by the circuit block 12 can not be expected, therefore it can be the that effects of the present invention are particularly big. Namely, the responsibility and low loss of the output by the auxiliary power supply circuit 10 can be made consistent while considering the stress of the load of the switching power supply device 1.

Note that the correspondence between the embodiment described above and the claims will be described below. The transformer T1 corresponds to the "transformer" of the claims of the present invention. The transistor Q1 corresponds to the "output control switch" of the claims of the present invention. The capacitors C1 and C2 correspond to the "first and second capacitors" of the claims of the present invention. The diodes D1, D2, D3, and D4 correspond to the "first, second, third, and fourth diodes" of the claims of the present invention. Further, the diode also corresponds to the "voltage limiting portion". The coil L1 corresponds to the "inductor" of the claims of the present invention. The circuit blocks 12 correspond to the "main voltage conversion portion" of the claims of the present invention. The diode D1 and the capacitor C1 correspond to the "auxiliary voltage conversion portion" of the claims of the present invention.

Second Embodiment

Figure 5:
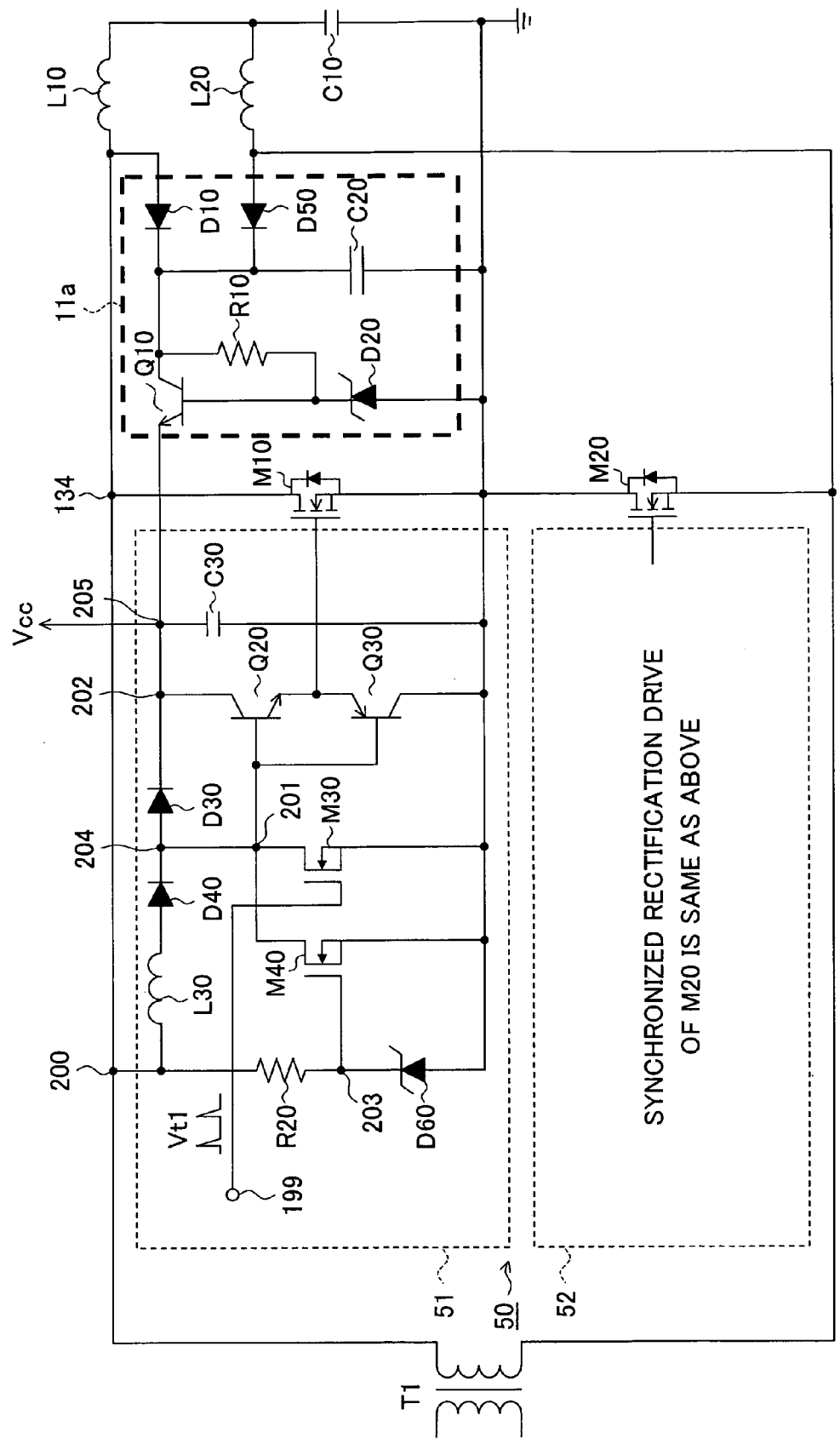
FIG. 5 is a diagram showing the circuit configuration of a synchronized rectification circuit of the switching power supply device according to a second embodiment of the present invention.

Next, a second embodiment of the present invention is described. In the present embodiment, there is described below the mode of assembling the power supply voltage generation circuit of the present invention in a synchronized rectification circuit of a current doubler type switching power supply device. FIG. 5 is a diagram showing the circuit configuration of a synchronized rectification circuit 50 on the secondary side of the transformer T1 in a switching power supply device 2 according to the present embodiment.

In the switching power supply device 2, under the control of a not shown primary side, the transformer T1 is controlled so as to alternately output a plus voltage and a minus voltage, turn off a rectifier constituted by the NMOS transistor M10 when outputting the plus voltage, and turn off a rectifier constituted by the NMOS transistor M20 when outputting the minus voltage. Note that when there is no output from the transformer T1, both of the rectification use NMOS transistor M10 and the SW2 become ON, and a commutation state where the energy stored in an inductor L10 or L20 is released is exhibited.

A synchronized rectification circuit 50 of FIG. 5 is configured by two systems of drive circuits performing reverse operations to each other in one cycle in order to control the NMOS transistors M10 and M20. Namely, the synchronized rectification circuit 50 has a drive circuit 51 for the rectification use NMOS transistor M10 and a drive circuit 52 for the rectification use NMOS transistor M20. The drive circuits 51 and 52 are symmetric about the ground line. FIG. 5 shows the circuit configuration of only the drive circuit 51 as a representative case. Below, the configuration of the drive circuit 51 will be described.

In FIG. 5, the drive circuit 51 receives a trigger signal Vt1 having a narrow bandwidth from a node 199 and supplies it to an NMOS transistor M30. Note that, a trigger signal Vt2 (not shown) fetched by the drive circuit 52 is a signal obtained by inversion of the phase from the trigger signal Vt1. The time when the drive circuit 51 receives the trigger signal Vt1 is set so as to become slightly earlier than the time when the voltage generated on the secondary side of the transformer T1 becomes plus. Due to this, before the $V_{ds}$ of the NMOS transistor M10 rises, the NMOS transistor M10 is turned off. Accordingly, at the time of the start of rectification of the NMOS transistor M20, a penetration current is prevented from flowing between the NMOS transistors M10 and M20.

The N channel transistor M30 is a control transistor for controlling the potential level of a node 201. The N channel transistor M30 is connected at the gate to the node 199, connected at the source to the ground terminal, and connected at the drain to bases of the transistors Q20 and Q30. Accordingly, it turns on in accordance with the time when the trigger signal Vt rises and makes the node 201 the ground potential.

The transistor Q30 is a control transistor for controlling the NMOS transistor M10. An emitter of the transistor Q30 is connected to a gate of the NMOS transistor M10, and a collector is connected to a ground terminal. A base of the transistor Q30 is connected via the node 201 to the drain of an N channel transistor M40. Accordingly, the transistor Q30 turns on when the potential level of the node 201 becomes the ground potential, drains the gate charges of the NMOS transistor M10, and turns off the NMOS transistor M10.

The transistor Q20 is a control transistor for controlling the NMOS transistor M10. An emitter of the transistor Q20 is connected to a gate of the NMOS transistor M10, and a collector is connected to a node 202. A base of the transistor Q20 is connected via the node 201 to the drain of the N channel transistor M40. In the state where the transistor Q20 becomes ON, the discharged current of a coil L30 charges the gate of the NMOS transistor M10 in the route from base to emitter of the transistor Q20. At the same time, the charge voltage of the capacitor C30 charges the gate of the NMOS transistor M10 by the route from the collector to the emitter.

The N channel transistor M40 is a control transistor for controlling the potential level of the node 201. The trigger signal Vt1 fetched from the node 199 returns to 0V soon in a shorter time than the time during which the voltage on the secondary side of the transformer T1 holds the H level, therefore, during the period where the Vs holds the H level (positive voltage) after the trigger signal Vt1 becomes 0V, the node 201 is brought to the ground potential by the N channel transistor M40 turning on. A gate of the N channel transistor M40 is connected to a node 203, a drain is connected to the node 201, and a source is connected to the ground terminal.

A resistor R20 and a diode D60 are connected between a node 200 and the ground terminal, and the node between the resistor R20 and the diode D60, that is, the node 203, is connected to the gate of the N channel transistor M40. The diode D60 and the resistor R20 configure a protection circuit for enabling adjustment of the gate potential level of the N channel transistor M40 and protecting it.

The coil L30 and a diode D40 are connected in series between the node 200 and a node 204. A diode D30 is connected between the node 204 and the node 202. The node 204 and the node 201 are connected. The node 201 is connected to bases of the transistors Q20 and Q30 for controlling the NMOS transistor M10. Due to this, when the voltage generated on the secondary side of the transformer T1 is at the H level (positive voltage), that is, when the node 200 is at the H level (positive voltage), the energy is stored by a current $I_{L30}$ of the coil L30, while when the voltage generated on the secondary side of the transformer T1 is at the L level (0V), that is, when the node 200 is at the L level (0V), the stored energy is released. By this released energy, the gate of the NMOS transistor M10 is charged, the NMOS transistor M10 is quickly turned on, and, at the same time, the excess of the released energy is stored in the capacitor C30.

The capacitor C30 is connected between a node 205 and the ground terminal. The capacitor C30 clamps the gate-source voltage $V_{gs}$ of the NMOS transistor M10 by its charge voltage via the transistor Q20. Further, when the voltage generated on the secondary side of the transformer T1 becomes the L level, the capacitor C30 quickly charges the gate of the NMOS transistor M10 via the collector→emitter of the transistor Q20 and turns on it.

The configuration of the drive circuit 51 was mainly described above, but the same is also true for the drive circuit 52. In this way, in the synchronized rectification circuit 50, the NMOS transistors M10 and M20 alternately perform a rectification operation in accordance with the polarity of the voltage generated on the secondary side of the transformer T1.

As described above, the drive circuit 51 drives the NMOS transistor M10 based on a signal obtained by combining the trigger signal Vt1 advanced in the rising timing with respect to the output of the transformer T1 and the drain voltage of the N channel transistor M40. At that time, the energy of the coil L10 is controlled and the gate of the NMOS transistor M10 is charged or discharged for the drive, therefore the time for turning on the parasitic diode of the NMOS transistor M10 is very short. Further, in the synchronized rectification circuit 50, no penetration current is generated in the NMOS transistors M10 and M20. The NMOS transistor M10 is always ON even at the time of commutation. Therefore, a circuit having an extremely high efficiency at the time of synchronized rectification is obtained.

In this synchronized rectification circuit 50, the drive circuit 51 includes a circuit corresponding to the circuit block 12 performing the switching mode operation described in the first embodiment. Namely, the coil L30 corresponds to the coil L1 in FIG. 3. The diodes D30 and D40 correspond to the diode D3 in FIG. 3. The capacitor C30 corresponds to the capacitor C2 in FIG. 3. The NMOS transistor M10 corresponds to the return diode D4 in FIG. 3. The synchronized rectification circuit 50, as shown in FIG. 5, is provided with a circuit block 11a corresponding to the circuit block 11 performing the linear mode operation described in the first embodiment. Note that the configuration of the circuit block 11a is the same as that of the circuit block 11, so the explanation is omitted here.

Immediately after the start of activation of the switching power supply device 2, the positive voltage generated in the secondary winding of the transformer T1 is supplied to the diode D10 of the circuit block 11a, the base current is supplied to the transistor Q10 via the resistor R10, and the transistor Q10 quickly turns on, therefore the voltage of the node 205 becomes $(V_Z - V_{BE})$ (note that, $V_z$: breakdown voltage of the diode D20, $V_{BE}$: forward direction voltage between the base and the emitter of the transistor Q10). Thereafter, by the positive voltage generated in the secondary winding of the transformer T1, when the output by the switching mode increases through a route of node 200→node 204→node 202→node 205, the operation switches from the linear mode to the switching mode, and the voltage of the node 205 (output terminal of the voltage Vcc) is determined mainly by the drive circuit 51.

Figure 6:
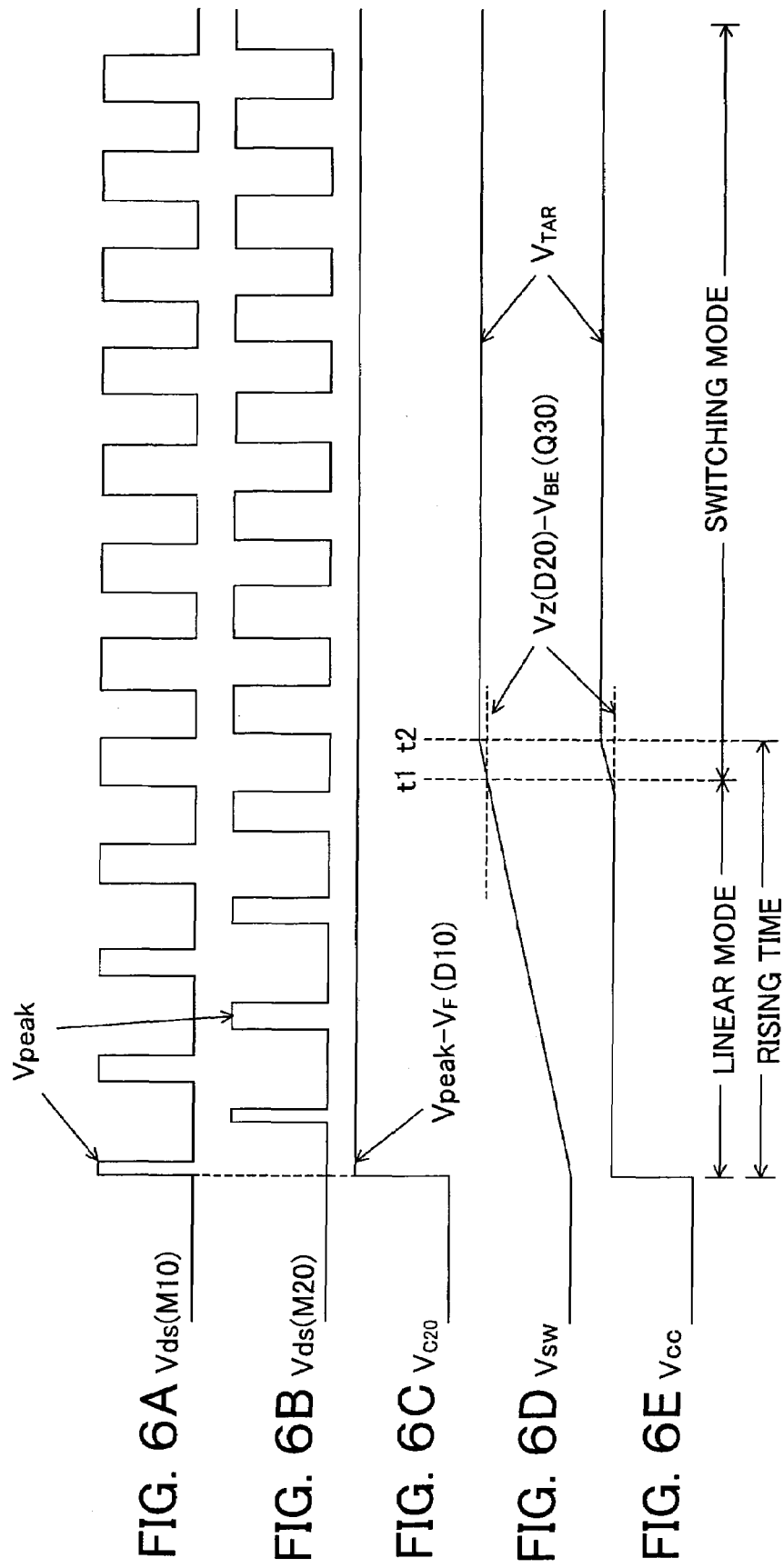
FIGS. 6A to 6E are timing charts showing the operation of the synchronized rectification circuit.

FIGS. 6A to 6E are timing charts showing the operation of the synchronized rectification circuit 50, in which FIG. 6A shows a waveform of $V_{ds}$ of the NMOS transistor M10, FIG. 6B shows a waveform of $V_{ds}$ of the NMOS transistor M20, FIG. 6C shows a waveform of a charge voltage $V_{C20}$ of the capacitor C20 of the circuit block 11a, FIG. 6D shows a waveform of the output voltage $V_{SW}$ of the node 205 when assuming that the circuit block 11a does not exist, and FIG. 6E shows a waveform of the actual output voltage Vcc of the node 205.

In the synchronized rectification circuit 50, as shown in FIGS. 6A and 6B, $V_{ds}$ of the NMOS transistors M10 and M20 gradually increase in duty ratio by the soft start. At the time of normal operation, their phases of them are offset by 180 degrees. Here, the peak voltage of $V_{ds}$ is $V_{peak}$. The circuit block 11a is provided in only the drive circuit 51. As shown in FIG. 6C, the capacitor C20 is quickly charged to $(V_{peak} - V_F(D10))$ in response to the first pulse generated in $V_{ds}$ of the NMOS transistor M10. In the same way as the explanation with reference to FIGS. 4A to 4D in the first embodiment, the operation switches from the linear mode to the switching mode at the time t1. Thereafter, the voltage of the node 205 is generated by the drive circuit 51. Since, as described above, the synchronized rectification circuit 50 according to the present embodiment includes a circuit block operating in the linear mode and a circuit block operating in the switching mode, effects the same as those of the auxiliary power supply circuit 10 described in the first embodiment are obtained. Namely, power supply voltage achieving both a good response and low loss can be extracted from the node 205.

Figure 7:
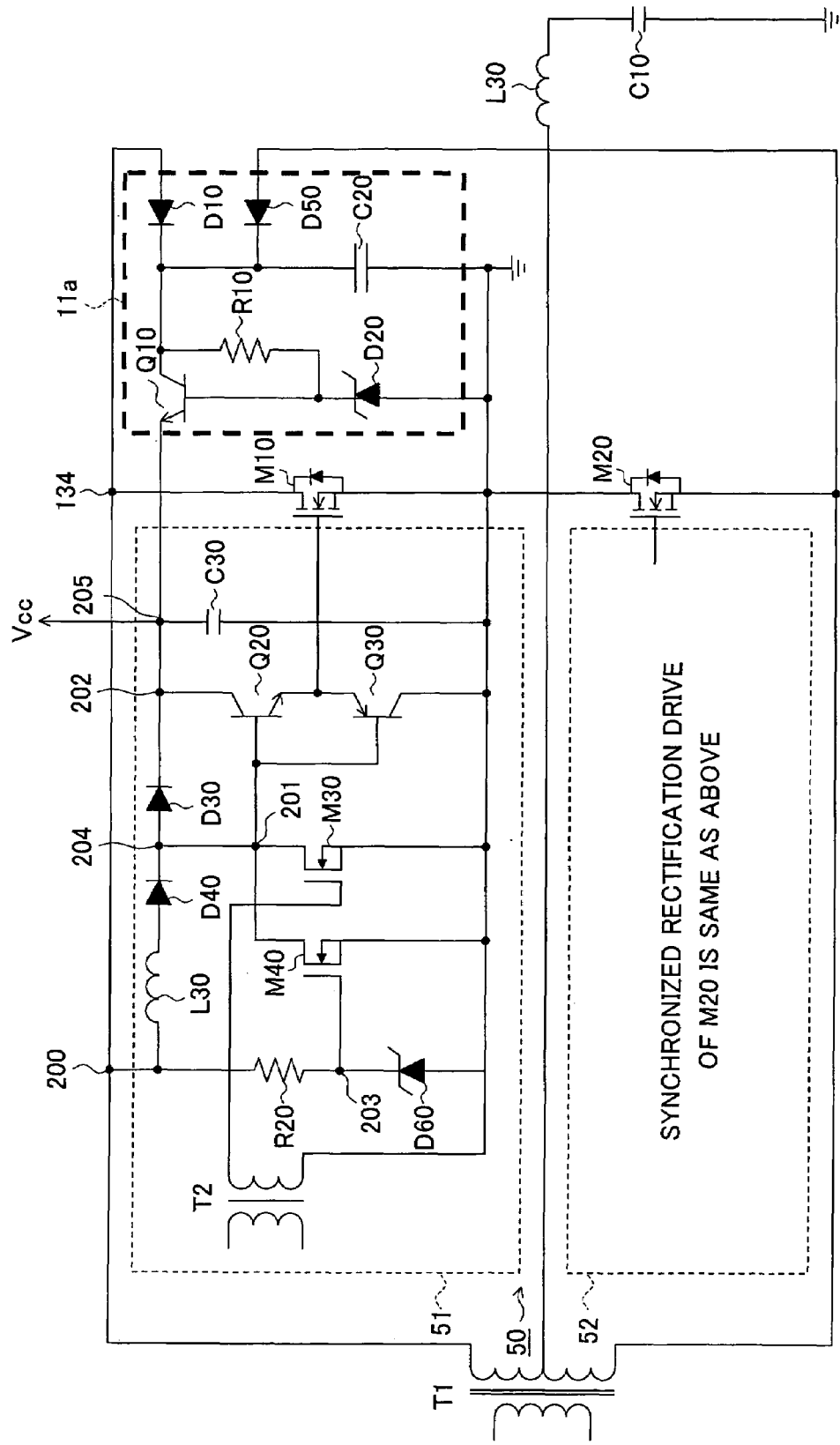
FIG. 7 is a diagram showing a modification of the switching power supply device according to the second embodiment of the present invention.

Note that it is possible to suitably modify the circuit configuration described in the above embodiment. For example, FIG. 7 is a modification of the switching power supply device 2 shown in FIG. 5 to a center tap synchronized rectification type, but the operation is the same as that of the switching power supply device 2. Further, the circuit configuration shown in FIG. 5 and FIG. 7 can be widely applied to a push-pull type, half bridge type, or full bridge type switching power supply device.

It should be understood by those skilled in the art that various modifications, combinations, sub-combinations and alterations may occur depending on design requirements and other factors insofar as they are within the scope of the appended claims or the equivalents thereof.

We claim:

1. A voltage conversion circuit comprising:
   a main voltage conversion portion for converting a pulse voltage excited on a secondary winding of a transformer to a first DC voltage and outputting from an output terminal;
   an auxiliary voltage conversion portion for inputting said pulse voltage, converting said pulse voltage to a second DC voltage in transit period of the pulse voltage up to shifting to a stationary state and capable of outputting to said output terminal;
   a voltage limiting portion for limiting said second DC voltage output from said auxiliary voltage conversion portion to a constant limit-voltage; and
   an output control switch provided in a pass between an output of said auxiliary voltage conversion portion and said output terminal for switching the pass to a conductive state or a nonconductive state to apply a higher voltage in between the first DC voltage and the second DC voltage at said output terminal based on a switching state of the output control switch.

2. A voltage conversion circuit as set forth in claim 1, wherein
   said output control switch is a transistor of which a control node is connected with said output of said auxiliary voltage conversion portion via a resistor and an output node is connected with said output terminal of the main voltage conversion portion, and
   said voltage limiting portion includes a Zener diode of which an anode is grounded and a cathode is connected with a connection point between said resistor and said control node.

3. A switching power supply device comprising:
   a switching circuit for switching an input voltage and generating a pulse width modulation signal;

a transformer having a secondary winding and an auxiliary winding and receiving said pulse width modulation signal;

a rectification circuit including a plurality of switch elements for rectifying a pulse voltage excited in said secondary winding of said transformer;

a control circuit for switching conductive states of the plurality of rectifiers based on an output voltage of said rectification circuit; and a power supply voltage generation circuit for generation a power supply voltage to be supplied to said control circuit, wherein said power supply voltage generation circuit comprises:

a main voltage conversion portion for converting said pulse voltage excited on said auxiliary winding of said transformer to a first DC voltage and outputting the DC voltage to an output terminal connected with said control circuit, an auxiliary voltage conversion portion for inputting said pulse voltage, converting the pulse voltage to a second DC voltage in transit period of the pulse voltage up to shifting to a stationary state and capable of outputting the second DC voltage to said output terminal, a voltage limiting portion for limiting said second DC voltage from said auxiliary voltage conversion portion to a constant limit-voltage, and an output control switch provided in a pass between an output of said auxiliary voltage conversion portion and said output terminal for switching the pass to a conductive state or a nonconductive state to apply a higher voltage in between the first DC voltage and the second DC voltage based on the switching state of said output control switch.

4. A switching power supply device as set forth in claim 3, wherein said switching circuit executes a soft start control by a control signal from said control circuit and supplies said pulse width modulation signal to a primary winding of the transformer which outputs the pulse voltage to the rectification circuit and supply voltage generation circuit, in which a duty ratio of said pulse width modulation signal linearly increases up to a stable state having a constant duty ratio.

* * * * *